US011132398B2

(12) United States Patent
Park et al.

(10) Patent No.: US 11,132,398 B2
(45) Date of Patent: Sep. 28, 2021

(54) ELECTRONIC DEVICE FOR GENERATING VIDEO COMPRISING CHARACTER AND METHOD THEREOF

(71) Applicant: Samsung Electronics Co., Ltd., Gyeonggi-do (KR)

(72) Inventors: Sunyoung Park, Gyeonggi-do (KR); Hangyul Kim, Gyeonggi-do (KR); Miji Park, Gyeonggi-do (KR); Chunhyoung Park, Gyeonggi-do (KR); Jiyoung Shin, Gyeonggi-do (KR); Jiwan Han, Gyeonggi-do (KR); Younghak Oh, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/704,123

(22) Filed: Dec. 5, 2019

(65) Prior Publication Data
US 2020/0183974 A1    Jun. 11, 2020

(30) Foreign Application Priority Data

Dec. 5, 2018  (KR) .................. 10-2018-0155328

(51) Int. Cl.
*G06F 16/73*    (2019.01)
*G06F 16/738*   (2019.01)
(Continued)

(52) U.S. Cl.
CPC .......... *G06F 16/739* (2019.01); *G06F 16/735* (2019.01); *G06F 16/7335* (2019.01); *G06F 16/743* (2019.01); *G06F 16/75* (2019.01)

(58) Field of Classification Search
CPC .................................................. G06F 16/739
(Continued)

(56) References Cited

U.S. PATENT DOCUMENTS 7,024,020 B2 *  4/2006  Lee ................... G06K 9/00744
                                                        382/103
9,013,604 B2    4/2015  Karn et al.
(Continued)

FOREIGN PATENT DOCUMENTS

CN         1367616 A       9/2002
CN       104796781 A       7/2015
(Continued)

OTHER PUBLICATIONS

International Search Report dated Mar. 23, 2020.
European Search Report dated May 13, 2020.
Chinese Search Report dated Nov. 24, 2020.

*Primary Examiner* — Reza Nabi
(74) *Attorney, Agent, or Firm* — Cha & Reiter, LLC.

(57) ABSTRACT

An electronic device and method are disclosed. The electronic device includes a display, a processor and memory. The processor may implement the method, including analyzing, by a processor, a first video to identify any characters included in the first video, displaying one or more icons representing one or more characters identified in the first video via a display, receiving, by input circuitry, a first user input selecting a first icon representing a first character from among the one or more icons, based on the first user input, selecting image frames of the first video that include the first character from among image frames included in the first video, and generating, by the processor, a second video including the selected image frames. A second embodiment includes automatically selecting images from a gallery including one or more characters for generation of a video.

17 Claims, 13 Drawing Sheets

(51) Int. Cl.
*G06F 16/74* (2019.01)
*G06F 16/732* (2019.01)
*G06F 16/75* (2019.01)
*G06F 16/735* (2019.01)

(58) Field of Classification Search
USPC ............................................................ 715/716
See application file for complete search history.

(56) References Cited

U.S. PATENT DOCUMENTS

| | | | | |
|---|---|---|---|---|
| 9,348,909 | B1* | 5/2016 | Goikhman | G06F 16/735 |
| 9,729,795 | B2* | 8/2017 | Song | G11B 27/3081 |
| 9,881,084 | B1* | 1/2018 | Robertson | G06F 16/70 |
| 10,509,966 | B1* | 12/2019 | Noel | G11B 27/031 |
| 2004/0216173 | A1* | 10/2004 | Horoszowski | H04N 21/6587 |
| | | | | 725/145 |
| 2009/0002479 | A1* | 1/2009 | Sangberg | H04N 7/147 |
| | | | | 348/14.02 |
| 2009/0103887 | A1* | 4/2009 | Choi | G06F 16/745 |
| | | | | 386/241 |
| 2009/0213270 | A1* | 8/2009 | Ismert | H04N 5/91 |
| | | | | 348/575 |
| 2012/0293687 | A1* | 11/2012 | Karn | H04N 5/23219 |
| | | | | 348/231.99 |
| 2012/0311632 | A1* | 12/2012 | Hill | H04N 21/4622 |
| | | | | 725/40 |
| 2012/0311636 | A1* | 12/2012 | Hill | G06F 16/7867 |
| | | | | 725/43 |
| 2012/0311639 | A1* | 12/2012 | Hill | H04N 21/4828 |
| | | | | 725/53 |
| 2013/0091432 | A1* | 4/2013 | Shet | G06F 16/532 |
| | | | | 715/719 |
| 2013/0254816 | A1* | 9/2013 | Kennedy | G11B 27/034 |
| | | | | 725/109 |
| 2014/0334797 | A1* | 11/2014 | Lee | G06F 16/739 |
| | | | | 386/241 |
| 2016/0019425 | A1* | 1/2016 | Yamaji | H04N 21/23418 |
| | | | | 386/239 |
| 2016/0210516 | A1* | 7/2016 | Kim | G06K 9/00751 |
| 2017/0330598 | A1* | 11/2017 | Choi | G11B 27/11 |
| 2018/0025079 | A1* | 1/2018 | Xiao | G06F 16/739 |
| | | | | 707/722 |
| 2018/0089203 | A1* | 3/2018 | Soni | G06F 16/738 |
| 2018/0288490 | A1* | 10/2018 | Thomas | H04N 21/47217 |
| 2018/0338167 | A1* | 11/2018 | Chi | H04N 21/2387 |
| 2018/0341705 | A1* | 11/2018 | Kim | G06K 9/00765 |
| 2019/0158928 | A1* | 5/2019 | Yoo | H04N 21/854 |
| 2019/0303682 | A1* | 10/2019 | Trim | G06K 9/623 |
| 2019/0377955 | A1* | 12/2019 | Swaminathan | G06K 9/6271 |

FOREIGN PATENT DOCUMENTS

| | | |
|---|---|---|
| CN | 108848334 A | 11/2018 |
| CN | 108933970 A | 12/2018 |
| JP | 2010-057003 A | 3/2010 |
| JP | 5990903 B2 | 9/2016 |
| KR | 10-1382499 B1 | 4/2014 |
| KR | 10-2017-0098113 A | 8/2017 |

\* cited by examiner

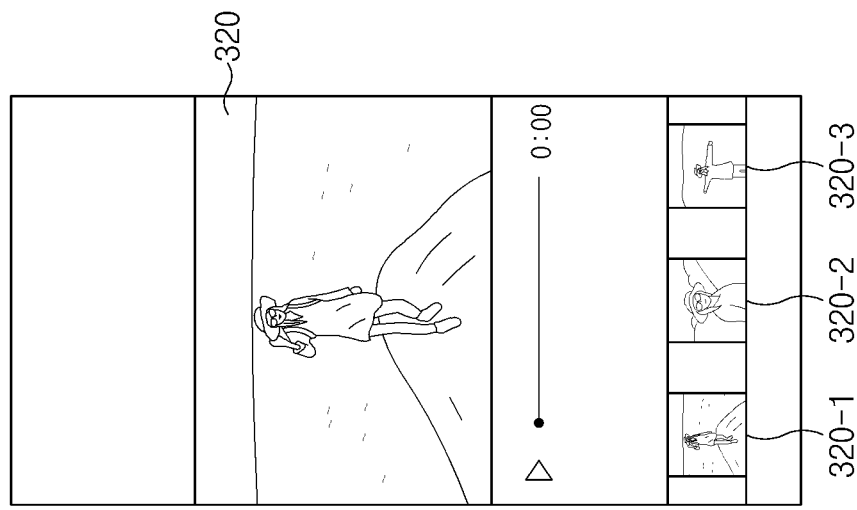
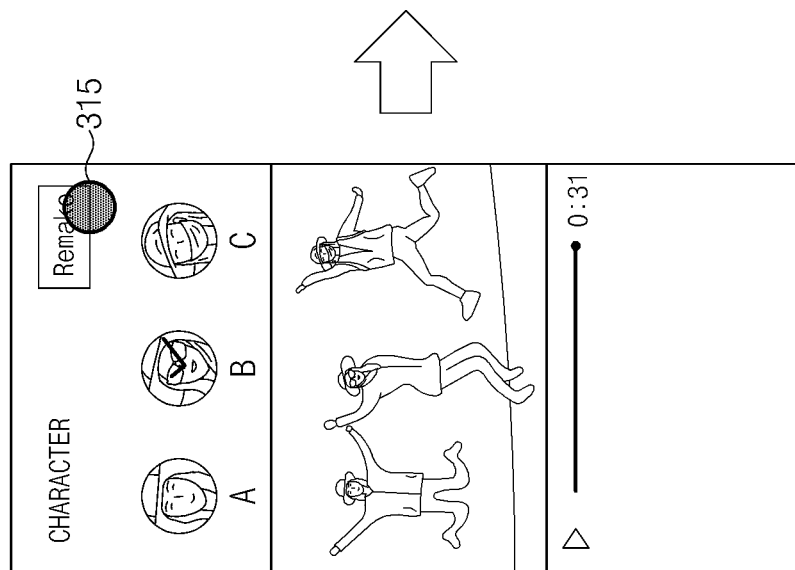
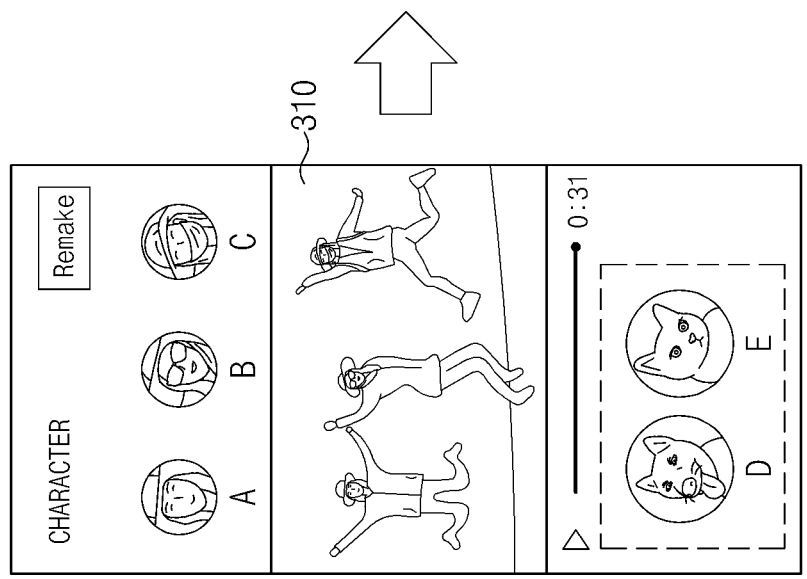
FIG. 3A
FIG. 3B
FIG. 3C

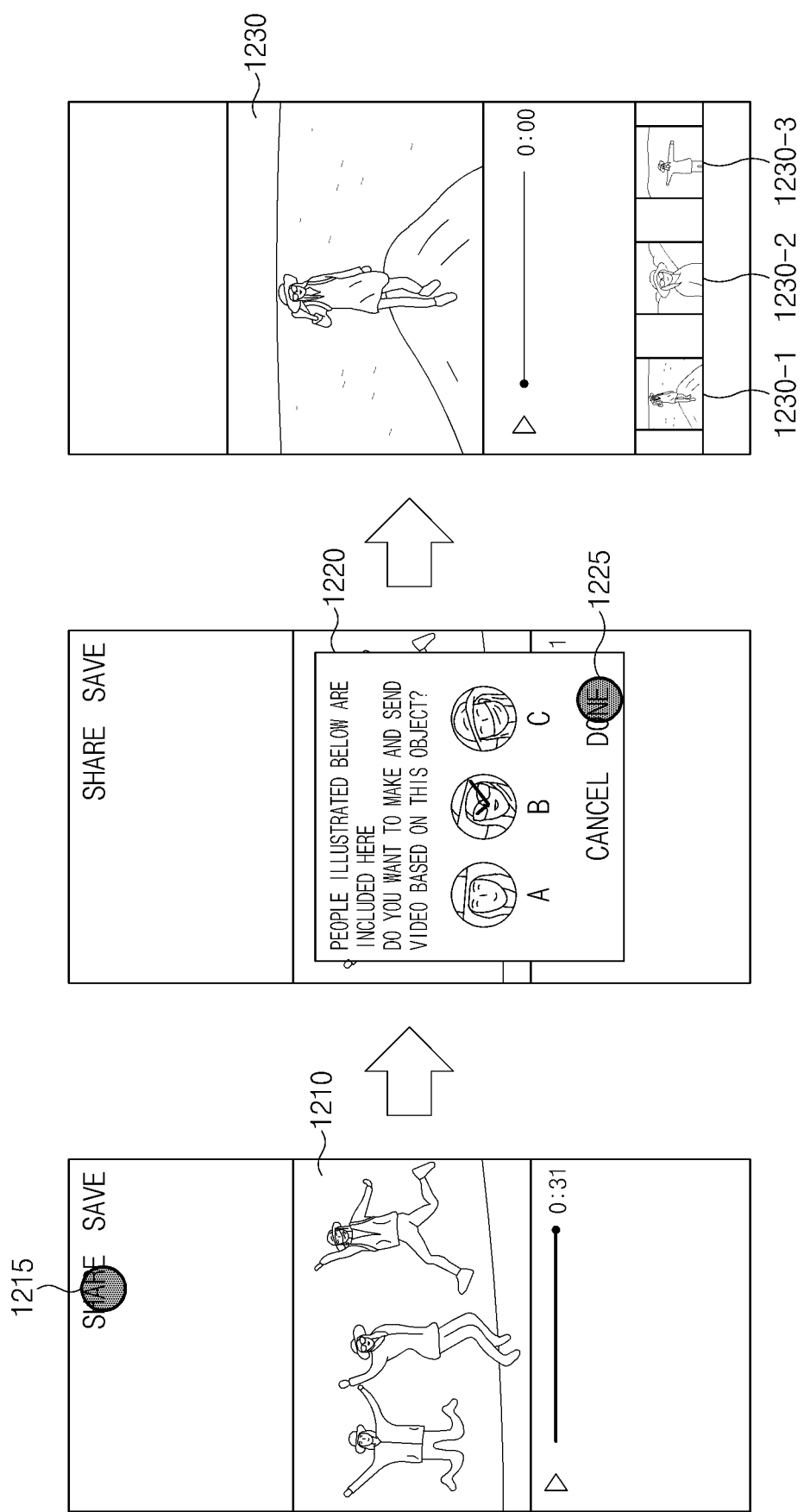

ELECTRONIC DEVICE FOR GENERATING VIDEO COMPRISING CHARACTER AND METHOD THEREOF

CROSS-REFERENCE TO RELATED APPLICATION(S)

This application is based on and claims priority under 35 U.S.C. § 119 to Korean Patent Application No. 10-2018-0155328, filed on Dec. 5, 2018, in the Korean Intellectual Property Office, the disclosure of which is incorporated by reference herein its entirety.

BACKGROUND

1. Field

The disclosure relates to an electronic device for generating a video, and, more particularly, to automatic generation of videos based on images including one or more designated characters, entities, and/or creatures included within the images.

2. Description of Related Art

With advances in image processing technology, more and more electronic devices are capable of automatically generating video media presentations using a collection of photographs. For example, the electronic device may generate multimedia video, in which a plurality of photos are displayed sequentially on the display, typically with the addition of animation and even background music. Thus, Such presentations are sometimes referred to as "stories," and accordingly, electronic devices are now capable of generating singular stories by receiving a collection of static photos and processing them with music, animation and other effects to be displayed within an aesthetically pleasant video presentation.

The above information is presented as background information only to assist with an understanding of the disclosure. No determination has been made, and no assertion is made, as to whether any of the above might be applicable as prior art with regard to the disclosure.

SUMMARY

For these "story" video presentations, a user may request a video to include a specific character (e.g., a person or an animal). However, at present, electronic devices typically generate these presentations by randomly selecting photos stored in a gallery application, in response to a user input requesting generation of the video presentation. Thus the generated video presentation may fail to reflect the user's request for the specific character. In some cases, the user may directly select the photos including the specific character by manual inputs made within a gallery application. However, this results in a serious inconvenience in requiring the user to manually select the desired photos from the gallery application.

Aspects of the disclosure are to address at least the above-mentioned problems and/or disadvantages and to provide at least the advantages described below. Accordingly, an aspect of the disclosure is to provide an electronic device that generates a video including the character desired by a user and a method thereof.

In accordance with an aspect of the disclosure, an electronic device may include a display, a processor operatively connected to the display, and a memory operatively connected to the processor. The memory may store instructions that, when executed, cause the processor to analyze a first video to identify any characters included in the first video, display one or more icons representing one or more characters identified in the first video via the display, receive a first user input selecting a first icon representing a first character from among the one or more icons, based on the first user input, select image frames of the first video that include the first character from among image frames included in the first video, and generate a second video including the selected image frames.

In accordance with another aspect of the disclosure, an electronic device may include a display, a processor operatively connected to the display, and a memory operatively connected to the processor. The memory may store instructions that, when executed, cause the processor to execute a gallery application and display, as part of the gallery application, a plurality of images stored in the memory, receive a first user input requesting generating of a video, analyze the plurality of images to identify one or more characters depicted in the plurality of images, in response to the first user input, display one or more icons representing the identified one or more characters via the display, receive a second user input selecting a first icon representing a first character of the one or more characters, based on the second user input, select images from among the plurality of images that include the first character, and generate the video including the selected images.

In accordance with another aspect of the disclosure, a method of an electronic device may include analyzing, by a processor, a first video to identify any characters included in the first video, displaying one or more icons representing one or more characters identified in the first video via a display, receiving, by input circuitry, a first user input selecting a first icon representing a first character from among the one or more icons, based on the first user input, selecting image frames of the first video that include the first character from among image frames included in the first video, and generating, by the processor, a second video including the selected image frames.

Other aspects, advantages, and salient features of the disclosure will become apparent to those skilled in the art from the following detailed description, which, taken in conjunction with the annexed drawings, discloses certain embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 3A, FIG. 3B, and FIG. 3C illustrates an operation of an electronic device generating a second video including a character by using a first video, according to certain embodiments;

FIG. 12A, FIG. 12B, and FIG. 12C illustrates an operation of an electronic device sharing a second video, according to certain embodiments; and FIG. 13A, FIG. 13B.

DETAILED DESCRIPTION

Hereinafter, certain embodiments of the disclosure will be described with reference to accompanying drawings. However, it should be understood that the disclosure is not intended to be limited to a specific embodiment, but intended to include various modifications, equivalents, and/or alternatives of the corresponding embodiment.

Figure 1:
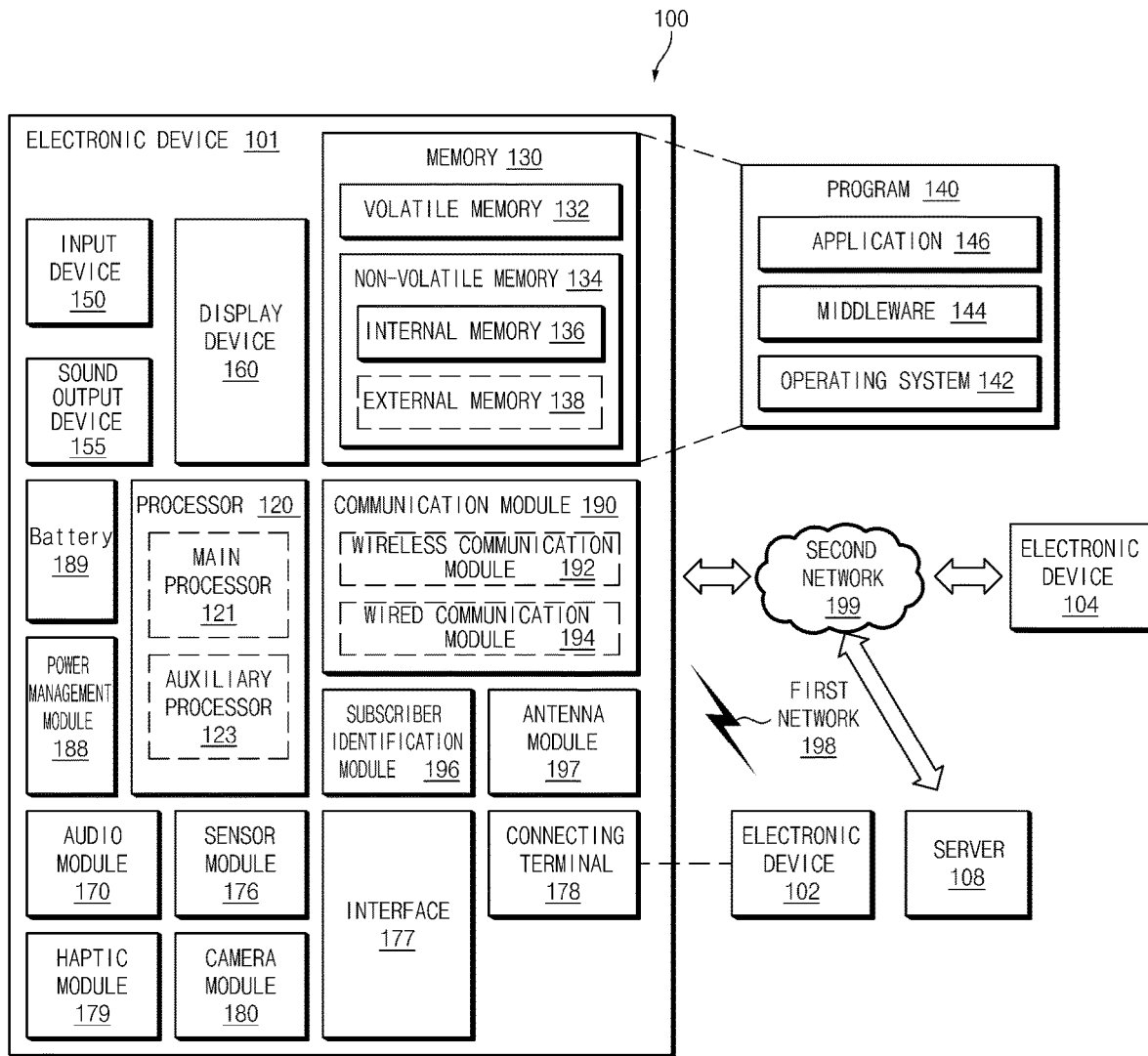
FIG. 1 is a block diagram of an electronic device in a network environment according to certain embodiments.

FIG. 1 is a block diagram of an electronic device 101 in a network environment 100, according to certain embodiments.

Referring to FIG. 1, the electronic device 101 in the network environment 100 may communicate with an electronic device 102 over a first network 198 (e.g., a short range wireless communication) or may communicate with an electronic device 104 or a server 108 over a second network 199 (e.g., a long range wireless communication). The electronic device 101 may communicate with the electronic device 104 through the server 108. According to an embodiment, the electronic device 101 may include a processor 120, a memory 130, an input device 150, a sound output device 155, a display device 160, an audio module 170, a sensor module 176, an interface 177, a haptic module 179, a camera module 180, a power management module 188, a battery 189, a communication module 190, a subscriber identification module 196, or an antenna module 197. In any embodiment, the electronic device 101 may not include at least one (e.g., the display device 160 or the camera module 180) of the above-described components or may further include one or more other components. In any embodiment, some of the components may be implemented as a single integrated circuit. For example, the sensor module 176 (e.g., a fingerprint sensor, an iris sensor, or an illuminance sensor) may be implemented while being embedded in the display device 160 (e.g., a display).

For example, the processor 120 may execute software (e.g., a program) to control at least another component (e.g., hardware or software component) of the electronic device 101 connected to the processor 120, and may process and calculate various types of data. According to an embodiment, as at least part of data processing or calculation, the processor 120 may load instructions or data received from other components (e.g., the sensor module 176 or the communication module 190) into a volatile memory 132, may process instructions or data stored in the volatile memory 132, and may store the result data in a nonvolatile memory 134. According to an embodiment, the processor 120 may include a main processor 121 (e.g., a central processing unit or an application processor) and an auxiliary processor 123 (e.g., a graphic processing unit, an image signal processor, a sensor hub processor, or a communication processor) capable of operating independently or together with the main processor. Additionally or alternatively, the auxiliary processor 123 may use lower power than the main processor 121 or may be configured to be specialized to a specified function. The auxiliary processor 123 may be implemented separately from the main processor 121 or as part of the main processor 121.

For example, the auxiliary processor 123 may control at least part of the functions or states associated with at least one (e.g., the display device 160, the sensor module 176, or the communication module 190) of the components of the electronic device 101, instead of the main processor 121 while the main processor 121 is in an inactive (e.g., sleep) state or together with the main processor 121 while the main processor 121 is in an active (e.g., the execution of an application) state. According to an embodiment, the auxiliary processor 123 (e.g., an image signal processor or a communication processor) may be implemented as a part of operatively associated other components (e.g., the camera module 180 or the communication module 190).

The memory 130 may store various pieces of data used by at least one component (e.g., the processor 120 or the sensor module 176) of the electronic device 101. For example, data may include software (e.g., a program 140) and input data or output data for instructions associated with the software. The memory 130 may include, for example, the volatile memory 132 or the nonvolatile memory 134.

The program 140 may be stored as software in the memory 130 and may include, for example, an operating system 142, a middleware 144, or an application 146.

The input device 150 may receive instructions or data to be used for the component (e.g., the processor 120) of electronic device 101, from the outside (e.g., a user) of the electronic device 101. The input device 150 may include, for example, a microphone, a mouse, a keyboard, or a digital pen (e.g., a stylus pen).

The sound output device 155 may output a sound signal to the outside of the electronic device 101. The sound output device 155 may include, for example, a speaker or a receiver. The speaker may be used for a general purpose, such as multimedia play or recording play, and the receiver may be used to receive an incoming call. According to an embodiment, the receiver may be implemented separately from the speaker or may be implemented as a part of the speaker.

The display device 160 may visually provide information to the outside (e.g., the user) of the electronic device 101. The display device 160 may include, for example, a display, a hologram device, or a projector and a control circuit for controlling a corresponding device. According to an embodiment, the display device 160 may include a touch circuitry configured to sense a touch, or a sensor circuitry (e.g., a pressure sensor) configured to measure the strength of force generated by the touch.

The audio module 170 may convert sound to an electrical signal, or reversely, may convert an electrical signal to sound. According to an embodiment, the audio module 170 may obtain sound through the input device 150, or may output sound through the sound output device 155, or through an external electronic device (e.g., the electronic device 102) (e.g., a speaker or a headphone) directly or wirelessly connected with the electronic device 101.

The sensor module 176 may sense an operation state (e.g., power or a temperature) of the electronic device 101 or an external environment state (e.g., a user state), and may generate an electrical signal or a data value corresponding the sensed state. According to an embodiment, the sensor module 176 may include, for example, a gesture sensor, a gyro sensor, a barometric pressure sensor, a magnetic sensor, an acceleration sensor, a grip sensor, a proximity sensor, a color sensor, an infrared (IR) sensor, a biometric sensor, a temperature sensor, a humidity sensor, or an illumination sensor.

The interface 177 may support one or more specified protocols that may be used to directly and wirelessly connect the electronic device 101 with an external electronic device (e.g., the electronic device 102). According to an embodiment, the interface 177 may include, for example, a high definition multimedia interface (HDMI), a universal serial bus (USB) interface, a secure digital (SD) card interface, or an audio interface.

A connecting terminal 178 may include a connector that may allow the electronic device 101 to be physically connected with an external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal to a mechanical stimulation (e.g., vibration or movement) or an electrical stimulation which the user may perceive through the sense of touch or the sense of movement. According to an embodiment, the haptic module 179 may include, for example, a motor, a piezoelectric sensor, or an electrical stimulation device.

The camera module 180 may photograph a still image and a video. According to an embodiment, the camera module 180 may include one or more lenses, image sensors, image signal processors, or flashes.

The power management module 188 may manage the power which is supplied to the electronic device 101. According to an embodiment, the power management module 188 may be implemented, for example, as at least part of a power management integrated circuit (PMIC).

The battery 189 may power at least one component of the electronic device 101. According to an embodiment, the battery 189 may include, for example, a primary cell not rechargeable, a secondary cell rechargeable, or a fuel cell.

The communication module 190 may establish a direct (or wired) communication channel or a wireless communication channel between the electronic device 101 and an external electronic device (e.g., the electronic device 102, the electronic device 104, or the server 108) and may perform communication through the established communication channel. The communication module 190 may include one or more communication processors which are operated independently of the processor 120 (e.g., an application processor) and support direct (or wired) communication or wireless communication. According to an embodiment, the communication module 190 may include a wireless communication module 192 (e.g., a cellular communication module, a short range wireless communication module, or a global navigation satellite system (GNSS) communication module) or a wired communication module 194 (e.g., a local area network (LAN) communication module or a power line communication module). A corresponding communication module of such communication modules may communicate with an external electronic device over the first network 198 (e.g., a short range communication network such as Bluetooth, Wi-Fi direct, or infrared data association (IrDA)) or the second network 199 (e.g., a long range communication network such as a cellular network, an Internet, or a computer network (e.g., LAN or WAN)). The above-described kinds of communication modules may be integrated in one component (e.g., a single chip) or may be implemented with a plurality of components (e.g., a plurality of chips) which are independent of each other. The wireless communication module 192 may identify and authenticate the electronic device 101 within a communication network, such as the first network 198 or the second network 199, by using subscriber information (e.g., international mobile subscriber identity (IMSI)) stored in the subscriber identification module 196.

The antenna module 197 may transmit a signal or a power to the outside (e.g., an external electronic device) or may receive a signal or a power from the outside. According to an embodiment, the antenna module may include one antenna including a radiator made of a conductor or a conductive pattern formed on a substrate (e.g., a PCB). According to an embodiment, the antenna module 197 may include a plurality of antennas. In this case, at least one antenna suitable for a communication scheme used in a communication network such as the first network 198 or the second network 199 may be selected, for example, by the communication module 190 from the plurality of antennas. The signal or power may be exchanged between the communication module 190 and an external electronic device through the selected at least one antenna. According to any embodiment, another component (e.g., RFIC) in addition to the radiator may be further formed as the part of the antenna module 197.

At least part of the components may be connected to each other through a communication scheme (e.g., a bus, a general purpose input and output (GPIO), a serial peripheral interface (SPI), or a mobile industry processor interface (MIPI)) between peripheral devices and may exchange signals (e.g., commands or data) with each other.

According to an embodiment, a command or data may be transmitted or received (or exchanged) between the electronic device 101 and the external electronic device 104 through the server 108 connected to the second network 199. Each of the electronic devices 102 and 104 may be a device of which the type is different from or the same as that of the electronic device 101. According to an embodiment, all or a part of operations to be executed in the electronic device 101 may be executed in one or more external devices of the external electronic devices 102, 104, or 108. For example, in the case where the electronic device 101 should perform any function or service automatically or in response to a request from the user or any other device, the electronic device 101 may additionally request one or more external electronic devices to perform at least part of the function or service, instead of internally executing the function or service. The one or more external electronic devices which receive the request may execute at least a part of the function or service thus requested or an additional function or service associated with the request, and may provide a result of the execution to the electronic device 101. The electronic device 101 may process received result as it is or additionally, and may provide a result of the processing as at least a part of the response to the request. To this end, for example, a cloud computing, distributed computing, or client-server computing technology may be used.

Figure 2:
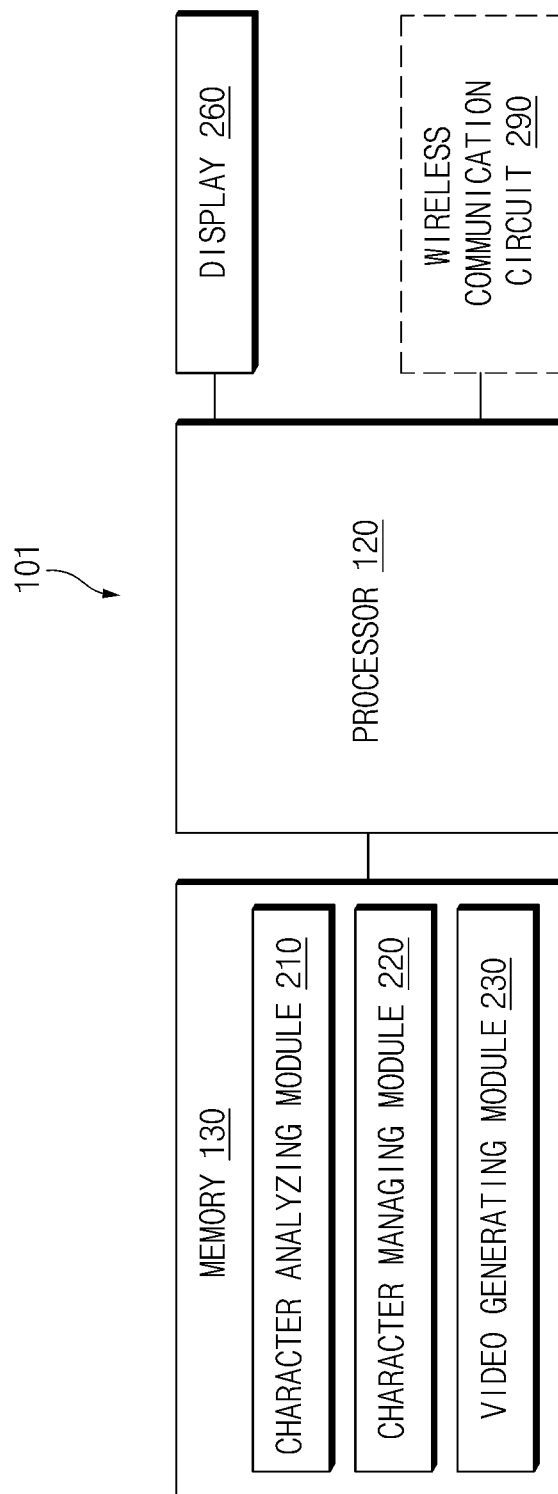
FIG. 2 is a functional block diagram of an electronic device, according to certain embodiments.

FIG. 2 is a functional block diagram of the electronic device 101, according to certain embodiments.

Referring to FIG. 2, the electronic device 101 may include the processor 120, the memory 130, and a display 260 (e.g., at least part of the display device 160 of FIG. 1). According to another embodiment, the electronic device 101 may further include at least one of the other components (e.g., such as the components illustrated in FIG. 1) in addition to the components illustrated in FIG. 2.

According to an embodiment, the display 260 may include a touch screen display capable of receiving a touch input. According to an embodiment, the display 260 may display an image (e.g., referred to as a "photo") or a video. According to an embodiment, the display 260 may display a graphic user interface (GUI) associated with the generation of a video presentation (e.g., a "story").

According to an embodiment, the memory 130 may store instructions for performing functions of the electronic device 101, including those for generating a video presentation. For example, the memory 130 may include a character analyzing module 210, a character managing module 220, and a video generating module 230. The modules stored in the memory 130 may indicate executable instructions and/or a software module (e.g., the program 140 of FIG. 1).

According to certain embodiments, the processor 120 may generate the video presentation by executing some of the instructions stored in the memory 130.

According to an embodiment, the processor 120 may analyze a plurality of images stored in a gallery application, using the character analyzing module 210. The processor 120 may select images including a specific character based on the analysis of the images. In this example, the "character" may indicate a person or an animal that appears in the images. The processor 120 may select still images from a video including a specific character as well, by analyzing the video to detect a presence of the character in certain frames of the video.

According to an embodiment, the processor 120 may manage the images which include the specific character using the character managing module 220. For example, the character managing module 220 may distinguish images which include the specific character but exclude other characters (e.g., do not include another character), from images including both the specific character and the other character and may save the distinguished images. In another example, the character managing module 220 may also save and detect images that have a location tag matching the location tag of the images known to include the specific character, but do not include the specific character.

According to an embodiment, the processor 120 may generate a video including a character, using the video generating module 230. In this example, the video generated by the electronic device 101 may be referred to as a "gallery story" provided by a Samsung Galaxy™ device. For example, the processor 120 may generate the video for the specific character using video using images including the specific character (e.g., and excluding images that do not include the character). In another example, the processor 120 may generate the video, using images including the specific character and the other character as well as a specific character. In this case, for the purpose of indicating that the generated video is the video for the specific character, the processor 120 may insert an image including the specific character into the first location and the last location of the video. In another example, the processor 120 may provide an environment in which a user may recall memories of a place where the specific character has been, by inserting images (e.g., a background image), the location tag of which is the same as the location tag of the image including the specific character even though not including the specific character, into the middle of the video.

According to an embodiment, the electronic device 101 may further include a wireless communication circuit 290 (e.g., at least part of the wireless communication module 192 of FIG. 1) to share the video with an external electronic device (e.g., 102, 104, or 108 of FIG. 1).

FIG. 3A, FIG. 3B, and FIG. 3C illustrates an example operation of the electronic device 101 generating a second video 320 including a character 'B' using a first video 310, according to certain embodiments.

Referring to FIG. 3A, the electronic device 101 may play the first video 310. According to an embodiment, the electronic device 101 may extract characters (e.g., entities, individuals, creatures or persons, etc. 'A', 'B', and 'C' or animals 'D' and 'E') that appear in the first video 310, by analyzing the frames (e.g., the still images) of the first video 310. The electronic device 101 may extract characters in real time, before playback of first video 310 is started, after playback of first video 310 is terminated, or while the first video 310 is being played.

According to an embodiment, the electronic device 101 may display the extracted characters on the display 260. An embodiment is exemplified in FIG. 3 as all of persons (e.g., 'A', 'B', and 'C') and animals (e.g., 'D' and 'E') are extracted. However, the electronic device 101 may extract the persons or the animals (e.g., to the exclusion of the other) in response to a user input. In the embodiments described later, the illustrations show persons being extracted. However, the same principle may be applied to an embodiment in which animals are extracted, as seen here. According to an embodiment, the electronic device 101 may display images representing persons (e.g., 'A', 'B', and 'C') and/or animals (e.g., D and E) at the upper end or the lower end of a region, in which the first video 310 is played, and/or may display the images representative of persons or the animals overlapping with the first video 310.

Referring to FIG. 3B, the electronic device 101 may receive a user input selecting the character 'B' from among the displayed characters 'A', 'B', and 'C'. After receiving the user input selecting the character 'B', the electronic device 101 may receive a user input 315 requesting generating of the second video 320.

Referring to FIG. 3C, the electronic device 101 may generate the second video 320 in response to the user input 315. The electronic device 101 may generate the second video 320 using images (e.g., 320-1, 320-2, and 320-3) including the second character 'B' as previously selected by the user. The electronic device 101 may play the second video 320 on the display 260. For example, the electronic device 101 may play the second video 320 at the same display location where the first video 310 is played.

According to an embodiment, the electronic device 101 may repeat generating the video including a specified character to create additional video presentations. For example, when the user input 315 is once again received after the second video 320 is played, the electronic device 101 may generate another video presentation, again based on the images including the character 'B'. In this case, the subsequent video presentation may be generated such that at least one of the type, the number, and/or the order of images included in the other new video are different from the video 320 generated previously. In another example, when a user input is received selecting another character (e.g., 'C') after the second video 320 is played, the electronic device 101 may generate a new video presentation including the new selected character. For the efficiency of the storage space of the memory 130, the electronic device 101 may save the second video to a storage device, until a user input to save the generated second video is received.

Figure 4:
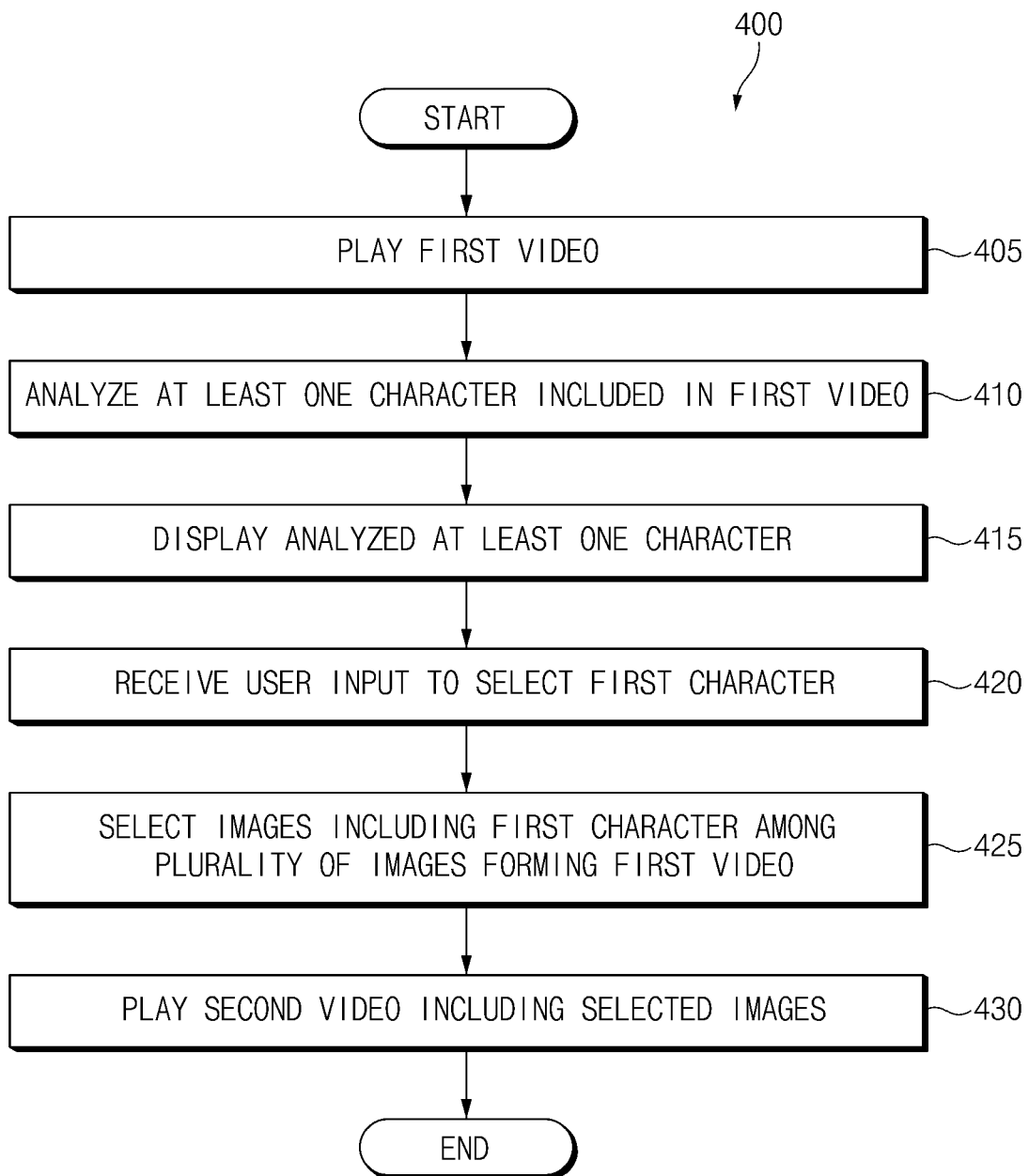
FIG. 4 illustrates an operation flowchart of an electronic device generating a second video including a character by using a first video, according to certain embodiments.

FIG. 4 illustrates an operation flowchart 400 of the electronic device 101 generating a second video (e.g., 320 of FIG. 3) including a character (e.g., 'B' of FIG. 3) by using a first video (e.g., 310 of FIG. 3), according to certain embodiments. The operation flowchart 400 and other operation flowcharts described later may be performed by the electronic device 101 or the component (e.g., the processor 120 of FIG. 2) included in the electronic device 101.

Referring to FIG. 4, in operation 405, the electronic device 101 may play the first video.

In operation 410, the electronic device 101 may analyze the first video to identify at least one character included in the first video. For example, the electronic device 101 may identify characters by detection of the faces of characters from the frames (e.g., still images) of the first video.

In operation 415, the electronic device 101 may display a representation of the at least one character identified from the first video. For example, the electronic device 101 may display an image including a face of an identified character, on a display (e.g., 260 of FIG. 2). One or more characters may be represented in this way for user selection.

In operation 420, the electronic device 101 may receive a user input selecting a first character (e.g., 'B' of FIG. 3) from among the displayed one or more identified characters.

In operation 425, the electronic device 101 may select images which are detected to include the selected first character from among the frames which form the first video.

In operation 430, the electronic device 101 may generate the second video (e.g., the video presentation) using the selected images (e.g., combined with animations, sounds, movements, effects, music, etc.) and may initiate playback of the generated video. It is noted that automatic generation of such videos are known such that details of the generation are omitted here for the sake of brevity.

Figure 5:
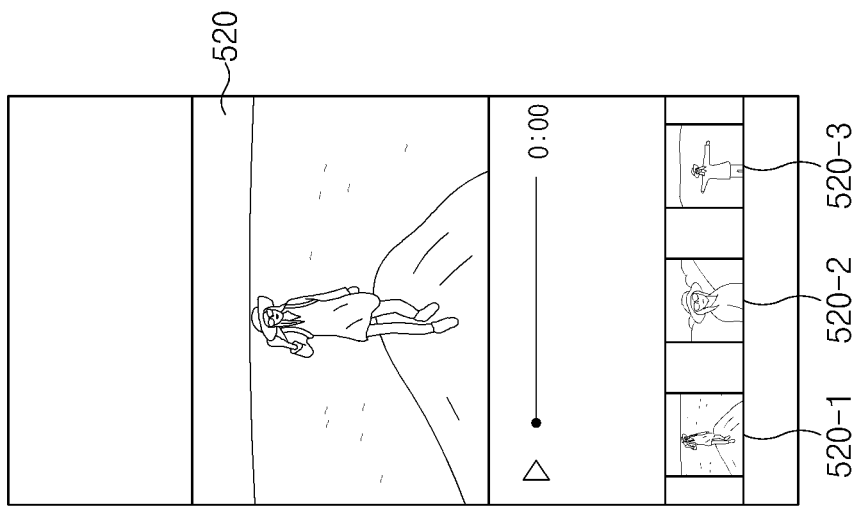
FIG. 5A, FIG. 5B, and FIG. 5C illustrates an operation of an electronic device generating a video including a character by using a plurality of images, according to certain embodiments.

FIG. 5A, FIG. 5B, and FIG. 5C illustrates an operation of the electronic device 101 generating a video 520 including a character 'B' by using a plurality of images 1, 2, . . . , and 24, according to certain embodiments.

Referring to FIG. 5A, the electronic device 101 may execute a gallery application. When the gallery application is executed, the electronic device 101 may display a list of a plurality of images 1, 2, . . . , and 24 stored in electronic device 101 within the user interface of the gallery application. The plurality of images stored in the gallery application may include static images (e.g., photos) and also dynamic images (e.g., animated images, clips and videos). According to an embodiment, the electronic device 101 may receive a user input 510 requesting generating of the video 520 while the list of the plurality of images 1, 2, . . . , and 24 is displayed.

According to an embodiment, the electronic device 101 may analyze the plurality of images 1, 2, . . . , and 24 in response to receiving the user input 510 to identify characters included within the plurality of images. Based on the analysis, the electronic device 101 may identify, for example, characters 'A', 'B', and 'C.' The electronic device 101 may extract the identified characters 'A', 'B', and 'C' included in the plurality of images 1, 2, . . . , and 24 based on the analysis of the plurality of images 1, 2, . . . , and 24. According to another embodiment, although not illustrated in FIG. 5, the electronic device 101 may extract the characters 'A', 'B', and 'C' by analyzing the plurality of images 1, 2, . . . , and 24 before the user input 510 is received (e.g., automatically upon execution of the gallery application, or at some other point of time).

Referring to FIG. 5B, the electronic device 101 may display the extracted characters 'A', 'B', and 'C' on the display 260 using the representations (e.g., icons or images) indicated in FIG. 5B. The electronic device 101 may receive a user input selecting the single character 'B' among the received characters 'A', 'B', and 'C'.

Referring to FIG. 5C, the electronic device 101 may generate a video 520 (e.g., the second video 320) in response to receiving a user input selecting the character 'B'. For example, the video 520 may be generated based on images (e.g., 520-1, 520-2, and 520-3) which, based on the analysis, were identified as including the character 'B'. The electronic device 101 may play the generated video 520 on the display 260.

Figure 6:
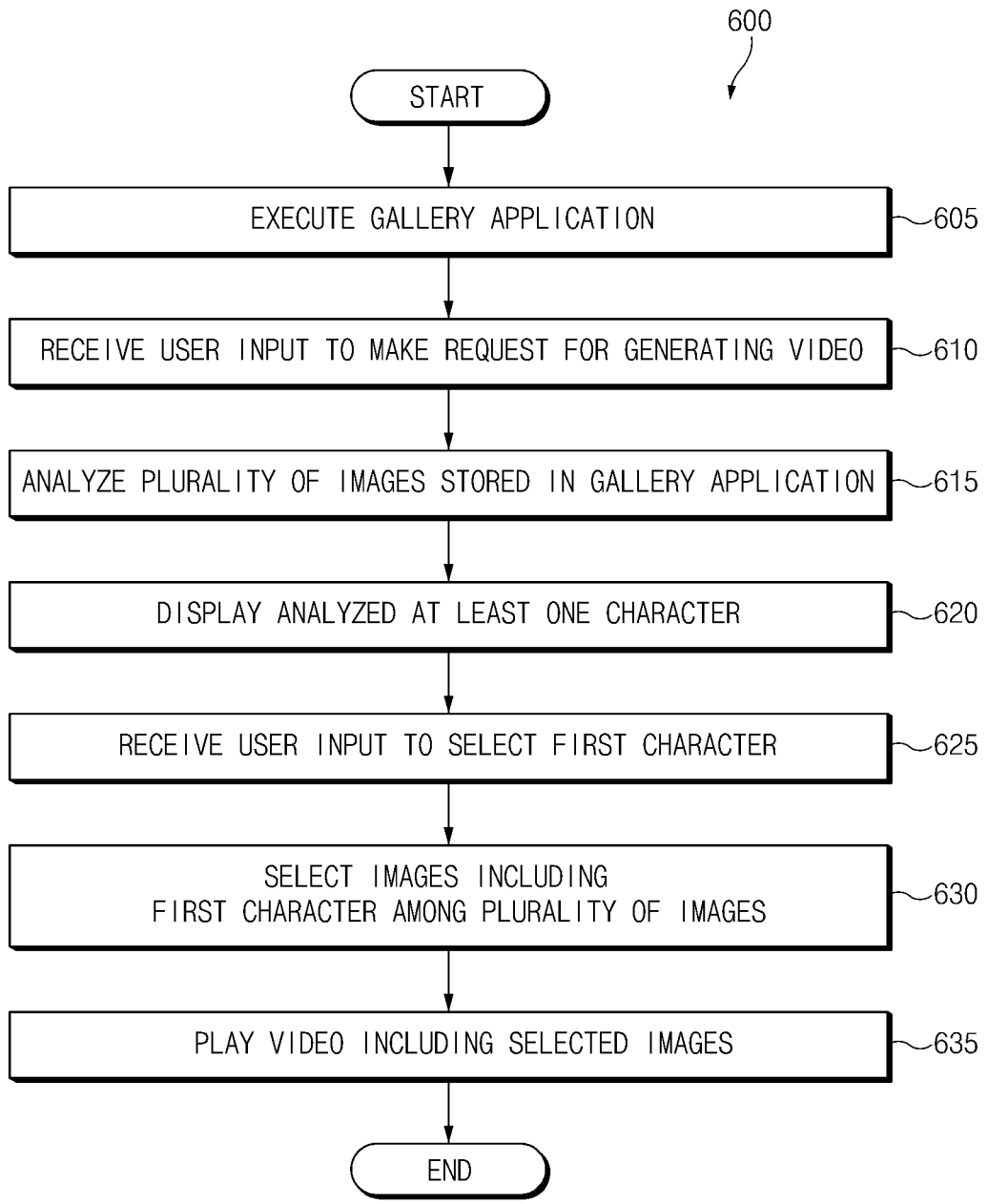
FIG. 6 illustrates an operation flowchart of an electronic device generating a video including a character by using a plurality of images, according to certain embodiments.

FIG. 6 illustrates an operation flowchart 600 of the electronic device 101 generating a video (e.g., 520 of FIG. 5) including a character (e.g., 'B' of FIG. 5) by using a plurality of images (e.g., 1, 2, . . . , and 24 of FIG. 5), according to certain embodiments.

In operation 605, the electronic device 101 may execute a gallery application. The gallery application may include a plurality of images. According to an embodiment, the gallery application may be stored in the memory 130.

In operation 610, the electronic device 101 may receive a user input (e.g., 510 of FIG. 5) requesting generating of a video presentation.

In operation 615, the electronic device 101 may analyze the plurality of images stored in the gallery application to identify characters included in each of the images. The electronic device 101 may extract any identified characters included in the plurality of images by detecting the faces of the characters included in the plurality of images.

In operation 620, the electronic device 101 may display the extracted at least one character on a display (e.g., 260 of FIG. 2). For example, the electronic device 101 may display representative images (e.g., thumbnails), each indicating a respective detected face of an identified character. One or more such images may be displayed indicating one or more characters.

In operation 625, the electronic device 101 may receive a user input selecting a first character (e.g., 'B' of FIG. 5) from among the displayed one or more characters.

In operation 630, responsive to the user input, the electronic device 101 may select images including the selected first character from among the plurality of images included in the gallery application.

In operation 635, the electronic device 101 may generate the video based on the selected images (e.g., using the selected images and adding animations, sounds, transitions, text, and/or any other presentation-appropriate effects) and may play the generated video.

Figure 7C:
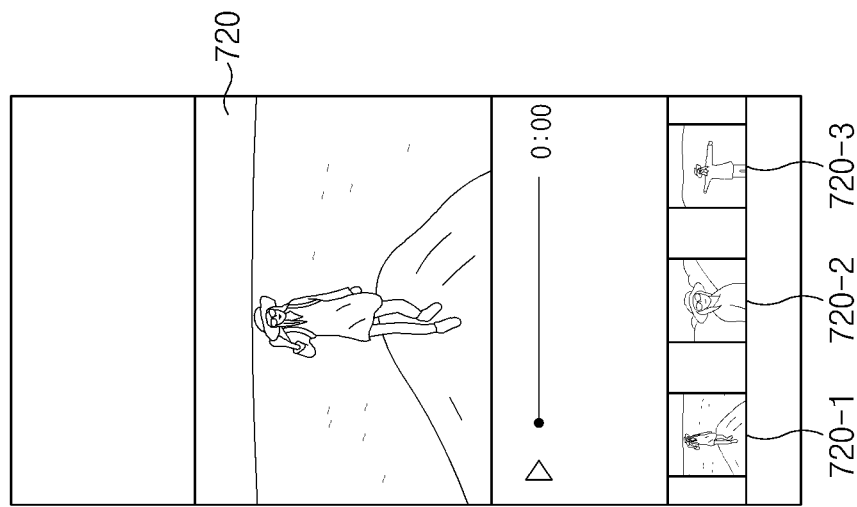
FIG. 7A, FIG. 7B, and FIG. 7C illustrates an operation of an electronic device generating a video including a character by using images selected by a user, according to certain embodiments.
Figure 7B:
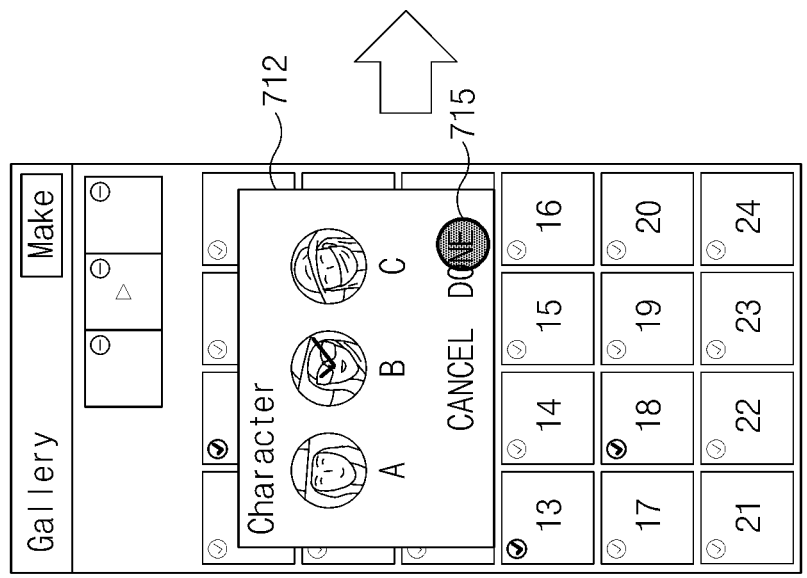
Figure 7A:
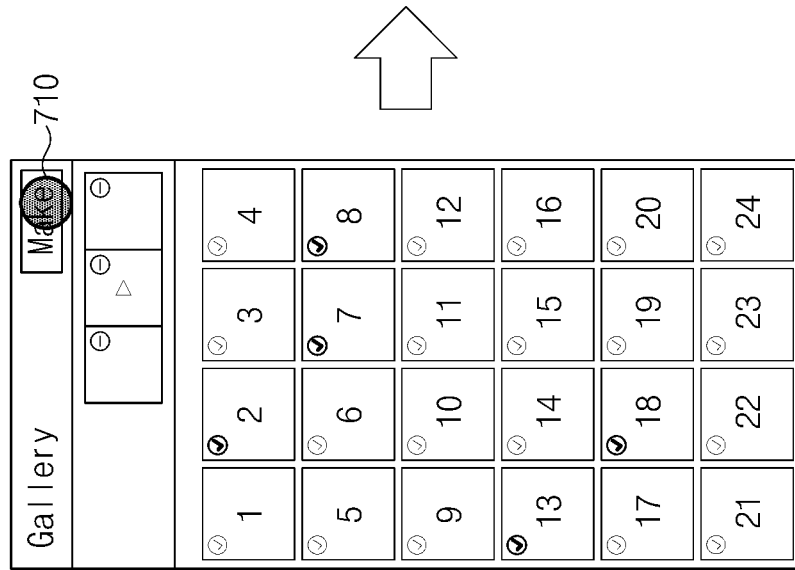

FIG. 7A, FIG. 7B, and FIG. 7C illustrates an operation of the electronic device 101 generating a video 720 including a character 'B' by using the images selected by a user, according to certain embodiments.

Referring to FIG. 7A, the electronic device 101 may execute a gallery application. When the gallery application is executed, the electronic device 101 may display the list of a plurality of images 1, 2, . . . , and 24 stored in the gallery application, on the display 260. A plurality of images stored in the gallery application may include not only a static image but also a dynamic image.

According to an embodiment, the electronic device 101 may receive a user input to select the images 2, 7, 8, 13, and 18 among the plurality of images 1, 2, . . . , and 24. After the images 2, 7, 8, 13, and 18 are selected, the electronic device 101 may receive a user input 710 to make a request for generating the video 720. According to an embodiment, when the user input 710 is received, the electronic device 101 may analyze the images 2, 7, 8, 13, and 18 selected by a user.

Referring to FIG. 7B, the electronic device 101 may display characters 'A', 'B', and 'C' extracted from the images 2, 7, 8, 13, and 18 selected by the user, on the display 260. For example, the electronic device 101 may display a pop-up window 712 including images indicating the faces of characters 'A', 'B', and 'C' overlapping with the execution screen of the gallery application. For another example, although not illustrated in FIG. 7, the electronic device 101 may display the extracted characters 'A', 'B', and 'C' on a separate screen.

According to an embodiment, the electronic device 101 may receive a user input to select the single character 'B' among the displayed characters 'A', 'B', and 'C' and may receive a user input 715 to select "done", as included within the pop-up window 712.

Referring to FIG. 7C, the electronic device 101 may generate the video 720 (e.g., the video 520 of FIG. 5) in response to the user input 715 to select "done". For example, the video 720 may be generated based on images (e.g., 720-1, 720-2, and 720-3) including the character 'B'. The electronic device 101 may play the video 720 on the display 260.

Figure 8:
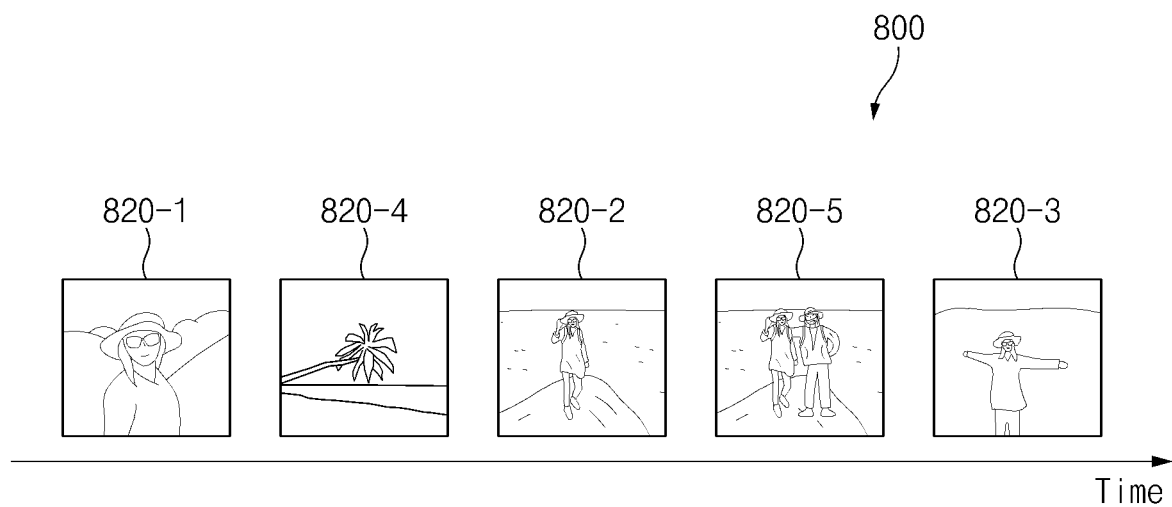
FIG. 8 illustrates an operation of an electronic device inserting images including a character, according to certain embodiments.

FIG. 8 illustrates an operation of the electronic device 101 inserting images including a character 'B', according to certain embodiments.

Referring to FIG. 8, the electronic device 101 may process a video 800 directly associated with a character 'B', by inserting other images including the character "B" or associated with the character "B" (e.g., 820-4 and 820-5, 820-1, 820-2, and 820-3) into the video 800, so as to produce a new video presentation using the foundation of the original video 800.

For example, although not including character 'B', the electronic device 101 may insert a background image (e.g., 820-4) (or referred to as a "landscape photo"), of which the location tag and the shooting date are the same as images 820-1, 820-2, and 820-3 including the character 'B', into the video 800. The location tag may indicate information about a location at which an image is captured. The electronic device 101 may compare the location tag and the shooting date of images stored in the character managing module 220 and may select the background image (e.g., 820-4), of which the location tag and the shooting date are the same as at least one image of images 820-1, 820-2, and 820-3 including the character 'B'. The background image 820-4 may not include the character 'B'. However, the electronic device 101 may determine that the character 'B' is positioned at a place indicated by the background image 820-4, based on the location tag and the shooting date.

For another example, the electronic device 101 may select the image 820-5 including character 'C' different from the character 'B' selected by a user.

According to an embodiment, for the purpose of indicating that the video 800 is the video for the character 'B', the electronic device 101 may set the priority of an image (e.g., at least one of 820-1, 820-2, or 820-3) including character 'B' (e.g., exclusively) to be high. The electronic device 101 may insert an image of a high priority into the first location or the last location of the video 800.

Figure 9:
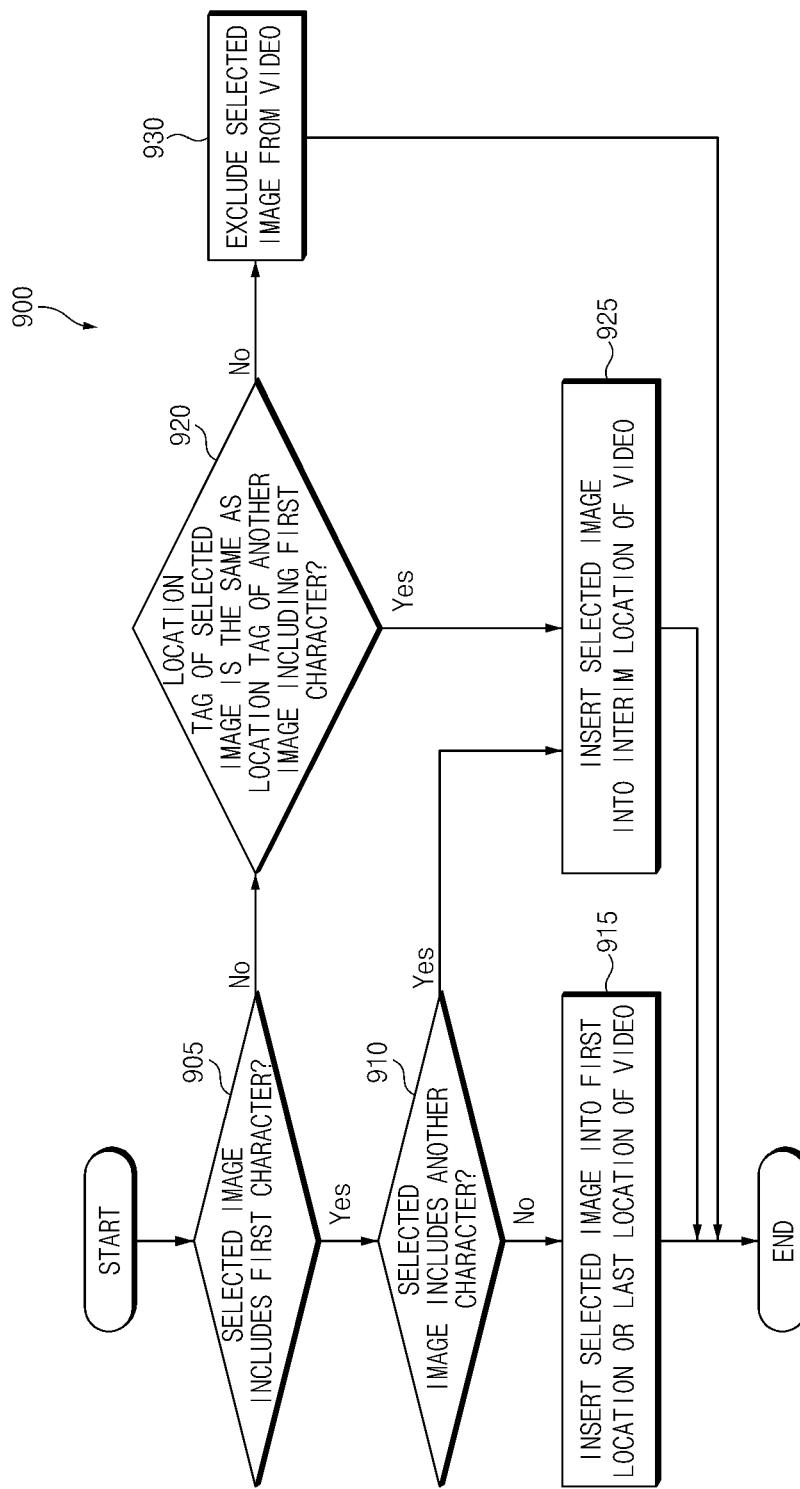
FIG. 9 illustrates an operation flowchart of an electronic device generating a video including a character and a background, according to certain embodiments.

FIG. 9 illustrates an operation flowchart 900 of the electronic device 101 inserting images including a character 'B', according to certain embodiments. The operations illustrated in the operation flowchart 900 may be an embodiment of operation 425 and operation 430 of FIG. 4 or may be an embodiment of operation 630 and operation 635 of FIG. 6.

Referring to FIG. 9, in operation 905, the electronic device 101 may identify whether the image selected among a plurality of images includes a first character (e.g., 'B' of FIG. 3). For example, a plurality of images may be still images included in the first video 310 in FIG. 3, may be the images 1, 2, . . . , and 24 stored in the gallery application in FIG. 5, or may be the images 2, 7, 8, 13, and 18 in FIG. 7 selected by a user.

When the selected image includes the first character, in operation 910, the electronic device 101 may identify whether the selected image includes another character (e.g., 'A' or 'C' of FIG. 3).

When the selected image does not include another character (e.g., 820-1, 820-2, or 820-3 of FIG. 8), in operation 915, the electronic device 101 may insert the selected image into the first location or the last location of the video.

When the selected image includes another character (e.g., 820-5 of FIG. 8), in operation 925, the electronic device 101 may insert the selected image into the middle location of the video. The middle location may mean the location other than the first location and the last location of the video.

When the selected image does not include the first character, in operation 920, the electronic device 101 may identify whether the location tag of the selected image matches the location tag of the other image including the first character. For another example, the electronic device 101 may compare shooting dates of the selected image and the other image to detect for matches between shooting dates to identify insertable photos that do not explicitly include the selected character. In yet another example, the electronic device and may compare location tags and shooting dates of the photographs to identify insertable photos that do not explicitly include the selected character.

When the location tag of the selected image matches the location tag of the other image (e.g., 820-4 in FIG. 8), in operation 925, the electronic device 101 may insert the selected image into an interim location within the video. For another example, when the location tag of the selected image is the same as the location tag of the other image and when the shooting date of the selected image is the same as the shooting date of the other image, the electronic device 101 may perform operation 925.

When the location tag or the shooting date of the selected image is different from the location tag or the shooting date of the other image, in operation 930, the electronic device 101 may exclude the selected image from the video.

Figures 10A, 10B:
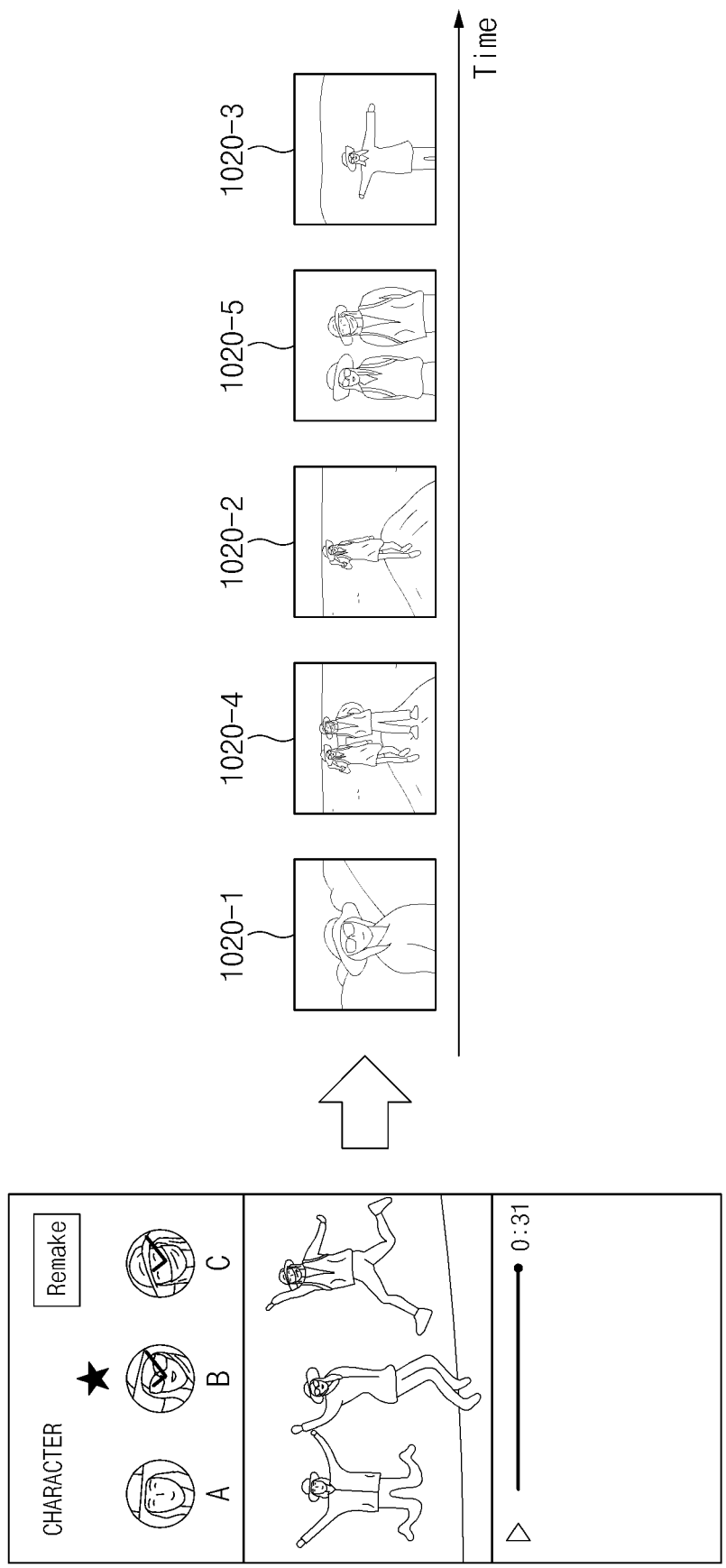
FIG. 10A and FIG. 10B illustrates an operation of an electronic device generating a video including a plurality of characters, according to certain embodiments.

FIG. 10A and FIG. 10B illustrates an operation of the electronic device 101 generating the video including a plurality of characters 'B' and 'C', according to certain embodiments, by allowing identification of a "main" character.

The screen displayed in FIG. 10A may correspond to the screen displayed in FIG. 3B, FIG. 5B, or FIG. 7B. According to an embodiment, the electronic device 101 may receive a user input selecting a plurality of characters 'B' and 'C'. After (or before) the plurality of characters 'B' and 'C' are selected, the electronic device 101 may receive a user input selecting the specific character (e.g., 'B') as a "main character." The electronic device 101 may set the priority of an image including the main character 'B' (e.g., exclusively without any other characters) to be greater than priorities of other selected characters, such that images with the main character 'B' are treated differently in generating the video presentation. For example, images including the main character 'B' and having superior priority may be inserted into preferential locations of the video, such as the first location or the last location of the video.

For example, referring to FIG. 10B, the electronic device 101 may select images (e.g., 1020-1, 1020-2, 1020-3, 1020-4, and 1020-5) including at least one character of the plurality of characters 'B' and 'C'. The electronic device 101 may insert an image (e.g., 1020-1, 1020-2, or 1020-3) of the high priority among the selected images into the first location or the last location of the video.

Figure 11:
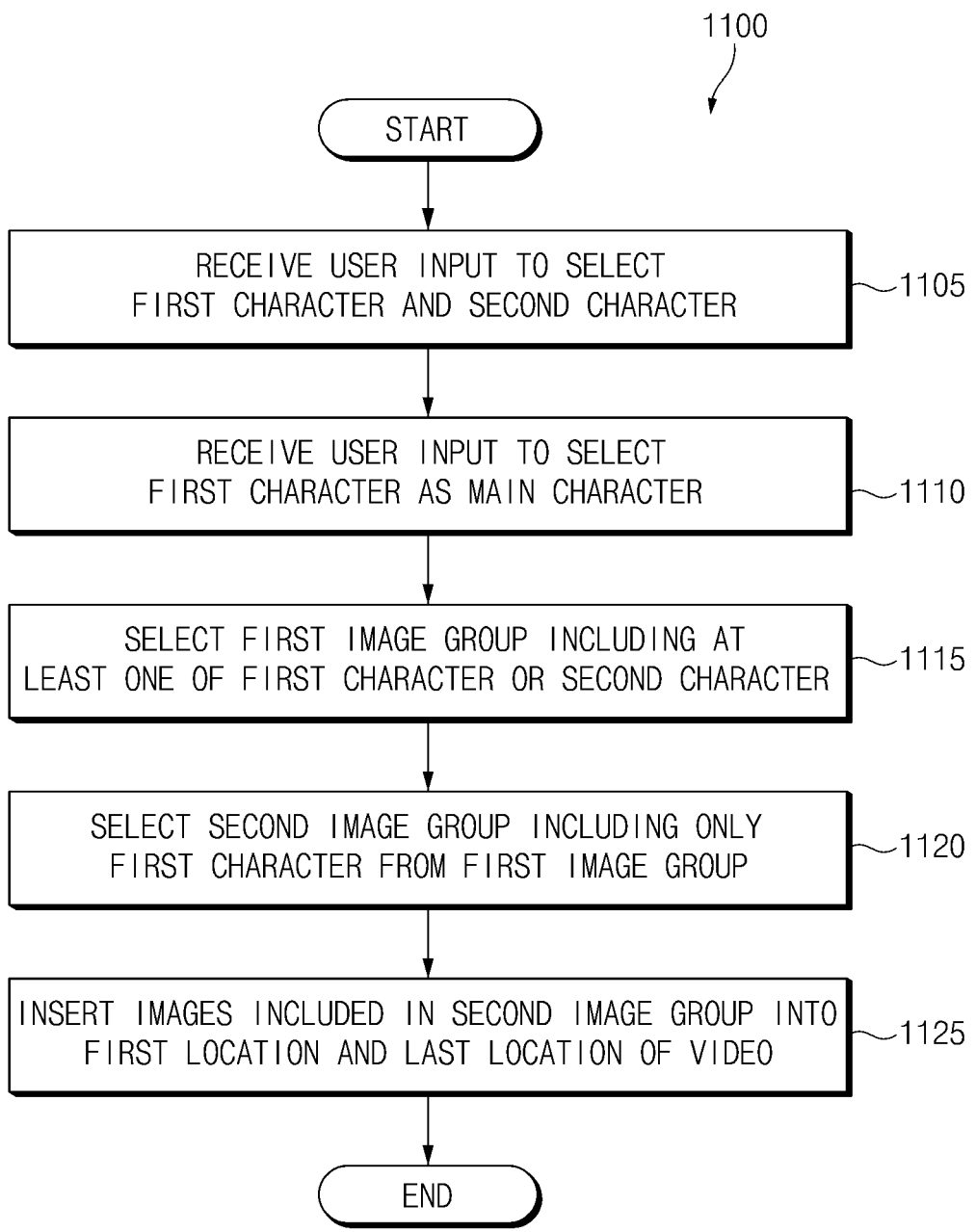
FIG. 11 illustrates an operation flowchart of an electronic device generating a video including a plurality of characters, according to certain embodiments.

FIG. 11 illustrates an operation flowchart 1100 of the electronic device 101 generating a video including a plurality of characters (e.g., 'B' and 'C' of FIG. 10), according to certain embodiments. The operations illustrated in FIG. 11 may be an embodiment of operation 420 to operation 430 of FIG. 4 or may be an embodiment of operation 625 to operation 635 of FIG. 6.

Referring to FIG. 11, in operation 1105, the electronic device 101 may receive a user input to select a first character (e.g., 'B' of FIG. 10) and a second character (e.g., 'C' of FIG. 10).

In operation 1110, the electronic device 101 may receive a user input to select the first character as a main character. According to an embodiment, after receiving the user input in operation 1110, the electronic device 101 may receive the user input in operation 1105.

In operation 1115, the electronic device 101 may select a first image group (e.g., 1020-1, 1020-2, 1020-3, 1020-4, and 1020-5 of FIG. 10) including at least one of the first character or the second character. According to another embodiment, the electronic device 101 may additionally select an image (e.g., a background image) of which the location tag and the shooting date are the same as those of at least one image included in the first image group, based on the embodiments in FIGS. 8 and 9.

In operation 1120, the electronic device 101 may select a second image group (e.g., 1020-1, 1020-2, and 1020-3 of FIG. 10) including the first character (e.g., exclusively) from the first image group.

In operation 1125, the electronic device 101 may insert the images included in the second image group into the first location and the last location of a video.

FIG. 12A, FIG. 12B, and FIG. 12C illustrates an operation of the electronic device 101 sharing a second video 1230, according to certain embodiments.

Referring to FIG. 12A, the electronic device 101 may receive a user input 1215 requesting sharing of a first video 1210 (e.g., 310 of FIG. 3) with an external electronic device. When the user input 1215 is received, the electronic device 101 may transmit a file associated with the first video 1210 to the external electronic device.

Referring to FIG. 12B, before transmitting the first video 1210, the electronic device 101 may analyze characters 'A', 'B', and 'C' included in the first video 1210. The electronic device 101 may inquire of a user whether to generate a second video 1230 including a character, by displaying a pop-up window 1220 indicating the analyzed characters 'A', 'B', and 'C'. For another example, although not illustrated in FIG. 12, the electronic device 101 may display the extracted characters 'A', 'B', and 'C' on a separate screen.

According to an embodiment, the electronic device 101 may receive a user input to select the single character 'B' among the displayed characters 'A', 'B', and 'C' and may receive a user input 1225 to select "done".

Referring to FIG. 12C, the electronic device 101 may generate the second video 1230 (e.g., the video 720 of FIG. 7C) in response to the user input 1225 to select "done". For example, the second video 1230 may be generated based on images (e.g., 1220-1, 1220-2, and 1220-3) including the character 'B'. The electronic device 101 may play the second video 1230 on the display 260 or may transmit the file associated with the second video 1230 to the external electronic device.

As described above, an electronic device (e.g., 101 of FIG. 1) may include a display (e.g., 260 of FIG. 2), a processor (e.g., 120 of FIG. 2) operatively connected to the display, and a memory (e.g., 130 of FIG. 2) operatively connected to the processor. The memory may store instructions that, when executed, cause the processor to play a first video (e.g., 310 of FIG. 3A), to analyze at least one character included in the first video, to display the analyzed at least one character via the display, to receive a first user input to select a first character (e.g., 'B' of FIG. 3) of the at least one character, to select images including the first character among a plurality of images included in the first video, in response to the first user input, and to play a second video (e.g., 320 of FIG. 3C) including the selected images.

According to an embodiment, the at least one character may include at least one of a person or an animal.

According to an embodiment, the instructions may cause the processor to select a first image among the plurality of images included in the first video, to identify whether the first image includes the first character, to identify whether the first image includes another character when the first image includes the first character, and to insert the first image into a first location or a last location of the second video when the first image does not include the other character.

According to an embodiment, the instructions may cause the processor to identify whether a location tag of the first image is the same as a location tag of a second image including the first character when the first image does not include the first character and to insert the first image into a middle location of the second video when the location tag of the first image is the same as the location tag of the second image.

According to an embodiment, the instructions may cause the processor not to select the first image when the location tag of the first image is different from the location tag of the second image.

According to an embodiment, the instructions may cause the processor to insert the first image into a middle location of the second video when the first image includes the other character.

According to an embodiment, the instructions may cause the processor to receive a second user input to select the first character and a second character among the at least one character, to receive a third user input to select the first character among the first character and the second character, as a main character, to select a first image group including at least one of the first character or the second character among the plurality of images included in the first video, in response to the second user input and the third user input, to select a second image group including the first character (e.g., exclusively) from the first image group, and to insert images included in the second image group, into a first location or a last location of the second video.

According to an embodiment, the electronic device may further include a wireless communication circuit transmitting a file associated with a first video or a second video to an external electronic device. The instructions may cause the processor to receive a fourth user input to make a request for sharing the first video with the external electronic device, to analyze the at least one character included in the first video, in response to the fourth user input, to display the analyzed at least one character via the display, to receive the first user input to select the first character of the at least one character, to select the images including the first character among a plurality of images included in the first video, in response to the first user input, to generate the second video based on the selected images, and to transmit a file associated with the second video to the external electronic device.

Figure 13A:
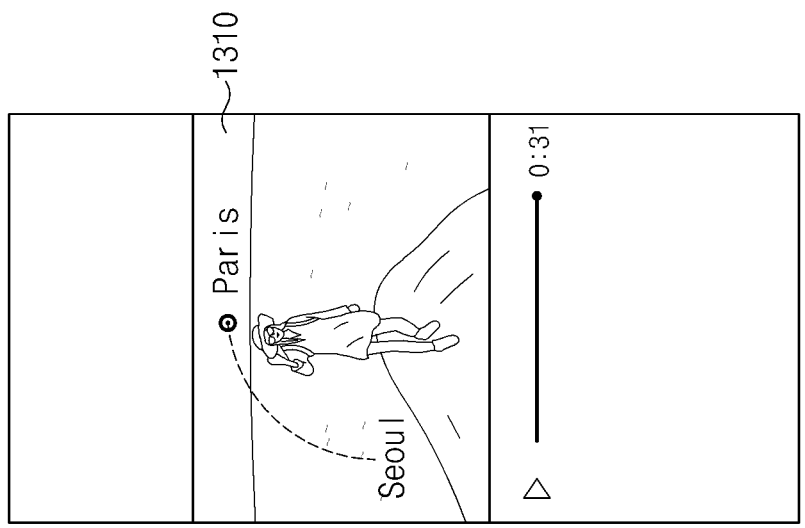
FIG. 13C illustrates an operation of an electronic device determining an image of a last location in a second video, according to certain embodiments.
Figure 13B:
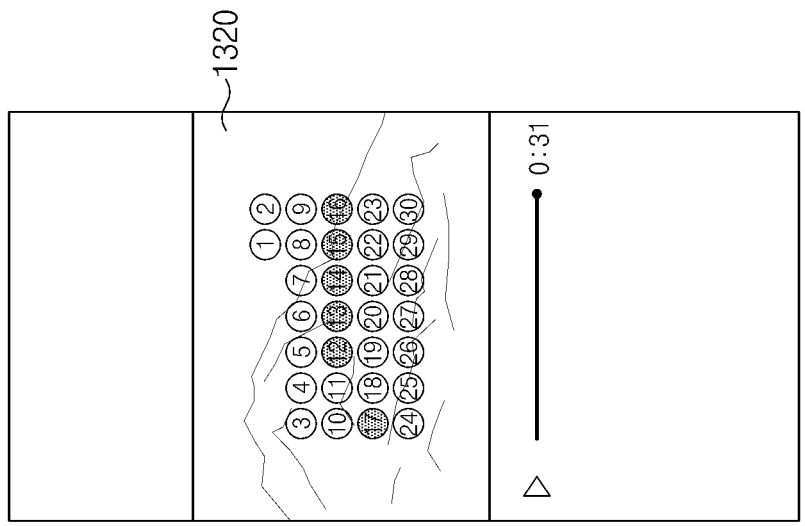
Figure 13C:
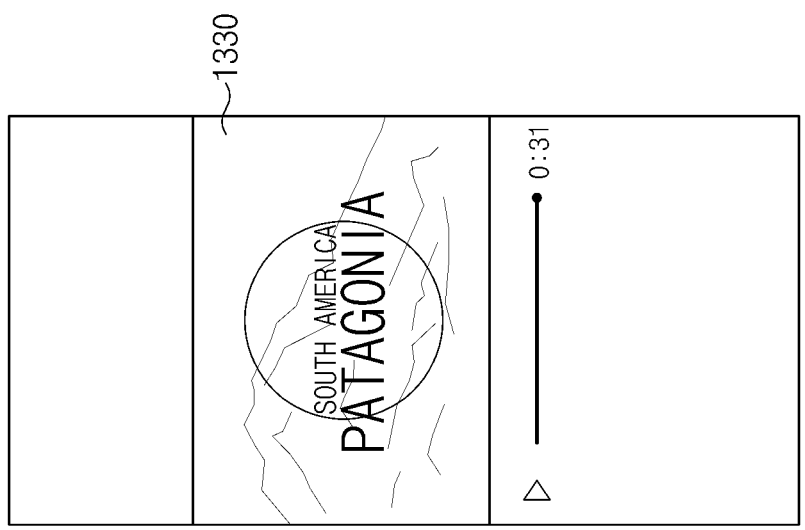

FIG. 13A, FIG. 13B, and FIG. 13C illustrates an operation of the electronic device 101 determining an image of a last location in a second video, according to certain embodiments.

Referring to FIG. 13A. FIG. 13B, and FIG. 13C, the electronic device 101 may insert the ending credit (or the last image) of a second video differently, based on the location tags of images included in the second video.

For example, as illustrated in FIG. 13A, the electronic device 101 may display a geographic location (e.g., Seoul or Paris) indicating in the location tags of images included in a second video 1310 overlap with the last image of the second video 1310. According to an embodiment, when images including a character include location tags identifying a geographic location or locations, the electronic device 101 may display the geographic locations on the last image of the second video 1310. For example, the location may include the name of at least a country or a city. The electronic device 101 may display locations to which an identified person (e.g., a character such as 'B') has traveled, by displaying text indicating the location the last image (or multiple images proximate to the end) of the second video 1310.

For another example, as illustrated in FIG. 13B, the electronic device 101 may display a graphic user interface (GUI) (e.g., calendar) indicating the shooting dates (e.g., from the twelfth to the seventeenth) of images included in the second video 1320, on the last image (or multiple images proximate to an end) of the second video 1320. According to an embodiment, the images may include a location tag indicating a country different from a country where the identified person is known to reside (e.g., Korea). Such images indicating a location outside the home-country may be automatically selected from among the images (e.g., selected exclusively), which are included in the second video 1320 including the character. Based on the location tag, the electronic device 101 may determine that the subset of images were captured while the person (e.g., the character) was traveling outside the home country. Accordingly, the electronic device 101 may include display of a schedule, during which the person (e.g., 'B') was traveling, by displaying GUI on the last image (or multiple images proximate to an end) of the second video 1320.

For another example, as illustrated in FIG. 13C, when there is a single location tag of a country different from a country (e.g., Korea) where a character resides, the electronic device 101 may display GUI indicating the country corresponding to a location tag, on the last image of a second video 1330.

As described above, an electronic device (e.g., 101 of FIG. 1) may include a display (e.g., 260 of FIG. 2), a processor (e.g., 120 of FIG. 2) operatively connected to the display, and a memory (e.g., 130 of FIG. 2) operatively connected to the processor. The memory may store instructions that, when executed, cause the processor to display a plurality of images stored in the gallery application via the display when a gallery application is executed, to receive a first user input to make a request for generating a video, to analyze at least one character included in the plurality of images in response to the first user input, to display the analyzed at least one character via the display, to receive a second user input to select a first character of the at least one character, to select images including the first character among the plurality of images, in response to the second user input, and to play the video including the selected images.

According to an embodiment, the instructions may cause the processor to receive a third user input to select at least one image among the plurality of images, to receive the first user input after the third user input is received, to analyze at least one character included in the at least one image, in response to the first user input, to display the analyzed at least one character via the display, to receive the second user input to select the first character of the at least one character, to select images including the first character among the at least one image, in response to the second user input, and to play the video including the selected images.

According to an embodiment, the instructions may cause the processor to select a first image among the plurality of images, to identify whether the first image includes the first character, to identify whether the first image includes another character when the first image includes the first character, and to insert the first image into a first location or a last location of the video when the first image does not include the other character.

According to an embodiment, the instructions may cause the processor to identify whether a location tag of the first image is the same as a location tag of a second image including the first character when the first image does not include the first character and to insert the first image into a middle location of the video when the location tag of the first image is the same as the location tag of the second image.

According to an embodiment, the instructions may cause the processor not to select the first image when the location tag of the first image is different from the location tag of the second image.

According to an embodiment, the instructions may cause the processor to insert the first image into a middle location of the video when the first image includes the other character.

According to an embodiment, the instructions may cause the processor to receive a fourth user input to select the first character and a second character among the at least one character, to receive a fifth user input to select the first character among the first character and the second character, as a main character, to select a first image group including at least one of the first character or the second character among the plurality of images, in response to the fourth user input and the fifth user input, to select a second image group including the first character (e.g., exclusively) from the first image group, and to insert images included in the second image group, into a first location or a last location of the video.

As described above, a method of an electronic device (e.g., 101 of FIG. 1) may include playing a first video, analyzing at least one character included in the first video, displaying the analyzed at least one character, receiving a first user input to select a first character of the at least one character, selecting images including the first character among a plurality of images included in the first video, in response to the first user input, and playing a second video including the selected images.

According to an embodiment, the selecting of the images including the first character among the plurality of images included in the first video may include selecting a first image among the plurality of images included in the first video, identifying whether the first image includes the first character, and identifying whether the first image includes another character when the first image includes the first character. The playing of the second video may include inserting the first image into a first location or a last location of the second video when the first image does not include the other character.

According to an embodiment, the selecting of the images including the first character among the plurality of images included in the first video further may include identifying whether a location tag of the first image is the same as a location tag of a second image including the first character when the first image does not include the first character. The playing of the second video may further include inserting the first image into a middle location of the second video when the location tag of the first image is the same as the location tag of the second image.

According to an embodiment, the selecting of the images including the first character among the plurality of images included in the first video may further include not selecting the first image when the location tag of the first image is different from the location tag of the second image.

According to an embodiment, the playing of the second video may further include inserting the first image into a middle location of the second video when the first image includes the other character.

According to certain embodiments disclosed in the disclosure, the electronic device may include various types of devices. The electronic device may include, for example, a portable communication device (e.g., a smartphone), a computer device, a portable multimedia device, a mobile medical appliance, a camera, a wearable device, or a home appliance. The electronic device according to an embodiment of the disclosure should not be limited to the above-mentioned devices.

Certain embodiments of the disclosure and terms used herein are not intended to limit the technical features described in the disclosure to specific embodiments, and it should be understood that the embodiments and the terms include modification, equivalent, or alternative on the corresponding embodiments described herein. With regard to description of drawings, similar or related components may be marked by similar reference marks/numerals. The singular form of the noun corresponding to an item may include one or more of items, unless interpreted otherwise in context. In the disclosure, the expressions "A or B", "at least one of A and B", "at least one of A or B", "A, B, or C", "at least one of A, B, and C", and "at least one of A, B, or C" may include any and all combinations of one or more of the associated listed items. The terms, such as "first" or "second" may be used to simply distinguish the corresponding component from the other component, but do not limit the corresponding components in other aspects (e.g., importance or order). When a component (e.g., a first component) is referred to as being "coupled with/to" or "connected to" another component (e.g., a second component) with or without the term of "operatively" or "communicatively", it may mean that a component is connectable to the other component, directly (e.g., by wire), wirelessly, or through the third component.

The term "module" used herein may include a unit, which is implemented with hardware, software, or firmware, and may be interchangeably used with the terms "logic", "logical block", "part", "circuit", or the like. The "module" may be a minimum unit of an integrated part or may be a minimum unit of the part for performing one or more functions or a part thereof. For example, according to an embodiment, the module may be implemented in the form of an application-specific integrated circuit (ASIC).

Certain embodiments of the disclosure may be implemented with software (e.g., program 140) including one or more instructions stored in a storage medium (e.g., the internal memory 136 or the external memory 138) readable by a machine (e.g., the electronic device 101). For example, the processor (e.g., the processor 120) of the machine (e.g., the electronic device 101) may call at least one instruction of the stored one or more instructions from a storage medium and then may execute the at least one instruction. This enables the machine to operate to perform at least one function depending on the called at least one instruction. The one or more instructions may include a code generated by a complier or a code executable by an interpreter. The machine-readable storage medium may be provided in the form of a non-transitory storage medium. Herein, 'non-transitory' just means that the storage medium is a tangible device and does not include a signal (e.g., electromagnetic waves), and this term does not distinguish between the case where data is semipermanently stored in the storage medium and the case where the data is stored temporarily.

According to an embodiment, a method according to certain embodiments disclosed herein may be provided to be included in a computer program product. The computer program product may be traded between a seller and a buyer as a product. The computer program product may be distributed in the form of a machine-readable storage medium (e.g., compact disc read only memory (CD-ROM)) or may be distributed (e.g., downloaded or uploaded), through an application store (e.g., PlayStore™), directly between two user devices (e.g., smartphones), or online. In the case of on-line distribution, at least part of the computer program product may be at least temporarily stored in the machine-readable storage medium such as the memory of a manufacturer's server, an application store's server, or a relay server or may be generated temporarily.

According to certain embodiments, each component (e.g., a module or a program) of the above-described components may include a single entity or a plurality of entities. According to certain embodiments, one or more components of the above-described components or operations may be omitted, or one or more other components or operations may be added. Alternatively or additionally, a plurality of components (e.g., a module or a program) may be integrated into one component. In this case, the integrated component may perform one or more functions of each component of the plurality of components in the manner same as or similar to being performed by the corresponding component of the plurality of components prior to the integration. According to certain embodiments, operations executed by modules, program, or other components may be executed by a successive method, a parallel method, a repeated method, or a heuristic method, or one or more of the operations may be executed in different sequences or omitted. Alternatively, one or more other operations may be added.

According to embodiments disclosed in the present disclosure, an electronic device may generate a video including the character desired by a user.

According to embodiments disclosed in the present disclosure, an electronic device may generate the video that includes a plurality of characters and includes a specific character as a main character among the plurality of characters.

Besides, a variety of effects directly or indirectly understood through the disclosure may be provided.

While the disclosure has been shown and described with reference to certain embodiments thereof, it will be understood by those skilled in the art that various changes in form and details may be made therein without departing from the disclosure as defined by the appended claims and their equivalents.

What is claimed is:

1. An electronic device, comprising:
   a display;
   a processor operatively connected to the display; and
   a memory operatively connected to the processor, wherein the memory stores instructions that, when executed, cause the processor to:
   analyze a first video to identify any characters included in the first video;
   display one or more icons representing one or more characters identified in the first video via the display;
   receive a first user input selecting a first icon representing a first character from among the one or more icons;
   based on the first user input, select image frames of the first video that include the first character from among image frames included in the first video; and
   generate a second video including the selected image frames,
   wherein selecting the image frames including the first character further comprises:
   detecting whether a first image from among the selected image frames includes:
   the first character displayed singly, or
   the first character with a second character different from the first character,
   wherein generating the second video further comprises:
   in response to detecting the first image includes the first character displayed singly, inserting the first image into a starting portion or an ending portion of the second video.

2. The electronic device of claim 1, wherein the characters include at least one of a person or an animal.

3. The electronic device of claim 1, wherein the instructions, when executed, further cause the processor to:
   select a second image of the first video that does not include the first character for inclusion in generating the second video, by:
   identifying whether a location tag of the second image matches a location tag of any of the image frames that include the first character,
   wherein when the location tag of the second image matches the location tag of any of the image frames that include the first character, generating the second video includes inserting the second image into an interim position within the second video.

4. The electronic device of claim 3, wherein the instructions, when executed, further cause the processor to:
   exclude further images of the first video from inclusion in generating the second video, when location tags of the further images are different from the location tags of all of the selected image frames including the first character of the first video.

5. The electronic device of claim 1, wherein the instructions, when executed, further cause the processor to:
   in response to detecting the first image includes the first character with the second character, inserting the first image into an interim position within the second video apart from the starting portion and the ending portion.

6. The electronic device of claim 1, wherein the instructions, when executed, cause the processor to:
   receive a second user input selecting a second character from among the one or more characters in addition to the first character;
   receive a third user input designating the first character as a main character;
   after receiving the second and third user inputs, select a first set of image-frames that include at least one of the first character or the second character from among the image frames included in the first video;
   select a second set of image frames from the first set of image frames including the first character and excluding the second character; and
   wherein generating the second video includes inserting images included in the second set of image frames into at least one of a starting portion or an ending portion of the second video.

7. The electronic device of claim 1, further comprising:
   a wireless communication circuit configured to transmit a file associated with the first video or the second video to an external electronic device,
   wherein the instructions, when executed, further cause the processor to:
   receive a fourth user input requesting sharing of the first video with the external electronic device,
   wherein the analyzing the first video, displaying the one or more icons, the receiving the first user input, the selecting the image frames of the first video, and the generating the second video are executed responsive to receiving the fourth user input.

8. An electronic device, comprising:
   a display;
   a processor operatively connected to the display; and
   a memory operatively connected to the processor, wherein the memory stores instructions that, when executed, cause the processor to:
   execute a gallery application and display, as part of the gallery application, a plurality of images stored in the memory;
   receive a first user input requesting generating of a video;
   analyze the plurality of images to identify one or more characters depicted in the plurality of images, in response to the first user input;
   display one or more icons representing the identified one or more characters via the display;
   receive a second user input selecting a first icon representing a first character of the one or more characters;
   based on the second user input, select images from among the plurality of images that include the first character; and
   generate the video including the selected images,
   wherein selecting the images including the first character further comprises:
   detecting whether a first image from among the selected images includes:
   the first character displayed singly, or the first character displayed with a second character different from the first character,
wherein generating the video further comprises:
in response to detecting the first image includes the first character displayed singly, inserting the first image into a starting portion or a ending portion of the video.

9. The electronic device of claim 8, wherein a third user input selecting at least one image from among the plurality of images is received prior to receiving the first user input.

10. The electronic device of claim 8, wherein the instructions, when executed, cause the processor to:
select other images from the plurality of images that do not include the first character for inclusion in generating the video, by:
identifying whether location tags of the other images match location tags of any of the images that include the first character,
wherein when the location tags of the other images match the location tags of any of the images that include the first character, generating the video includes inserting the other images into interim positions within the video.

11. The electronic device of claim 10, wherein the instructions, when executed, cause the processor to:
exclude further images of the plurality of images from inclusion in generating the video, when the location tags of the further images are different from the location tags of all of the images including the first character.

12. The electronic device of claim 8, wherein the instructions, when executed, further cause the processor to:
in response to detecting the first image includes the first character with the second character, inserting the first image into an interim position within the video apart from the starting portion and the ending portion.

13. The electronic device of claim 8, wherein the instructions, when executed, cause the processor to:
receive a third user input selecting a second character from among the one or more characters in addition to the first character;
receive a fourth user input designating the first character as a main character;
after receiving the third and fourth user inputs, select a first set of images that include at least one of the first character and the second character from among the plurality of images; and
select a second set of images from the first set of images including the first character and excluding the second character,
wherein generating the video includes inserting images included in the second set of images into at least one of a starting portion or an ending portion of the video.

14. A method in an electronic device, comprising:
analyzing, by a processor, a first video to identify any characters included in the first video;
displaying one or more icons representing one or more characters identified in the first video via a display;
receiving, by input circuitry, a first user input selecting a first icon representing a first character from among the one or more icons;
based on the first user input, selecting image frames of the first video that include the first character from among image frames included in the first video; and
generating, by the processor, a second video including the selected image frames,
wherein selecting the image frames including the first character further comprises:
detecting whether a first image from among the selected image frames includes:
the first character displayed singly, or
the first character with a second character different from the first character,
wherein generating the second video further comprises:
in response to detecting the first image includes the first character displayed singly, inserting the first image into a first location or a last location of the second video.

15. The method of claim 14, further comprising:
selecting a second image of the first video that does not include the first character for inclusion in generating the second video, by:
identifying whether a location tag of the second image matches a location tag of any of the image frames that include the first character,
wherein when the location tag of the second image matches the location tag of any of the image frames that include the first character, generating the second video includes inserting the second image into an interim position within the second video.

16. The method of claim 15, further comprising:
excluding further images of the first video from inclusion in generating the second video, when the location tags of the further images are different from the location tags of all of the selected image frames including the first character of the first video.

17. The method of claim 14, wherein when the first image includes the other character, generating the second video includes inserting the first image into an interim position within the second video.

* * * * *